US011819938B2

(12) United States Patent
Toguyeni

(10) Patent No.: US 11,819,938 B2
(45) Date of Patent: Nov. 21, 2023

(54) SEALING HOLLOW STRUCTURES

(71) Applicant: Acergy France SAS, Suresnes (FR)

(72) Inventor: Gregory Alexandre Toguyeni, La Garenne-Colombes (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 17/590,757

(22) Filed: Feb. 1, 2022

(65) Prior Publication Data

US 2022/0152729 A1    May 19, 2022

Related U.S. Application Data

(62) Division of application No. 16/424,384, filed on May 28, 2019, now Pat. No. 11,253,950.

(30) Foreign Application Priority Data

May 29, 2018    (GB) ...................................... 1808738

(51) Int. Cl.
*B23K 20/00* (2006.01)
*B23K 20/12* (2006.01)
*B23K 101/10* (2006.01)

(52) U.S. Cl.
CPC ........ *B23K 20/129* (2013.01); *B23K 2101/10* (2018.08)

(58) Field of Classification Search
CPC ............. B23K 20/129; B23K 20/1255; B23K 20/126; B23K 20/1235; B23K 20/1245; B23K 20/125; B23K 20/1265; B23K 20/128; B23K 20/1295; B23K 20/227; B23K 2101/06; B23K 2101/10; B23K 2103/05; B23K 37/0531; B23K 37/06; B23K 20/12; B23K 20/1215; B23K 20/122; B23K 20/123; B23K 20/127;
(Continued)

(56) References Cited

U.S. PATENT DOCUMENTS 2,997,165 A * 8/1961 Leuthy ...................... F42B 3/00
                                                              220/555
5,697,544 A * 12/1997 Wykes ................. B23K 20/125
                                                              228/2.1
(Continued)

FOREIGN PATENT DOCUMENTS

CN        1737484      2/2006
CN        1854670     11/2006
(Continued)

OTHER PUBLICATIONS

EP0215591A NPL (Year: 2022).*

*Primary Examiner* — Erin B Saad
(74) *Attorney, Agent, or Firm* — Mattingly & Malur, PC

(57) ABSTRACT

A method of sealing a hole in a wall of a hollow structure comprises providing a sealed chamber that is external to the structure and that is in fluid communication with an internal space of the structure via the hole. The structure may be a pipe-in-pipe structure and the internal space may be an annulus between outer and inner pipes. Fluid flows through the hole into or out of the chamber as the pressure and/or composition of fluid in the internal space is adjusted. Then, a plug is spun and friction-welded into the hole. The plug is inserted into the hole from within the chamber.

12 Claims, 5 Drawing Sheets

Figure 1:
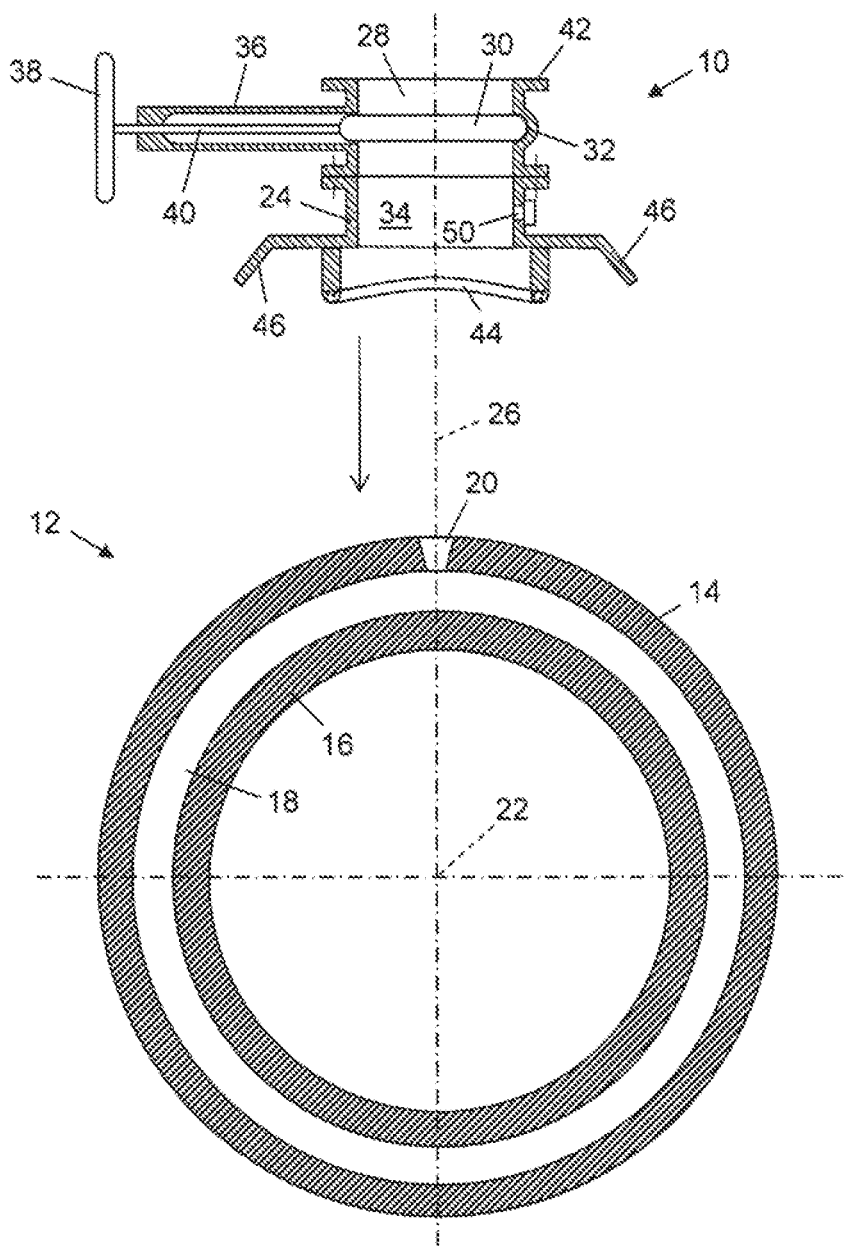

(58) Field of Classification Search
CPC .. B23K 20/14; B23K 20/24; B23K 2101/003; B23K 2103/10
See application file for complete search history.

(56) References Cited

U.S. PATENT DOCUMENTS

| | | | | |
|---|---|---|---|---|
| 10,293,431 | B2* | 5/2019 | Okada | B23K 20/128 |
| 10,695,821 | B2* | 6/2020 | Li | B21K 25/005 |
| 2001/0038027 | A1* | 11/2001 | Coletta | B23K 20/12 |
| | | | | 228/2.1 |
| 2002/0125297 | A1* | 9/2002 | Stol | B23K 20/127 |
| | | | | 228/114.5 |
| 2008/0296350 | A1* | 12/2008 | Henneboehle | B23K 20/1245 |
| | | | | 228/2.1 |
| 2009/0152328 | A1* | 6/2009 | Okamoto | B23K 20/128 |
| | | | | 228/2.1 |
| 2011/0198389 | A1* | 8/2011 | Hattingh | B23K 20/127 |
| | | | | 228/2.1 |
| 2019/0039119 | A1* | 2/2019 | Li | B21J 15/025 |
| 2019/0366472 | A1* | 12/2019 | Toguyeni | F16L 59/065 |

FOREIGN PATENT DOCUMENTS

| | | |
|---|---|---|
| CN | 205278679 | 6/2016 |
| EP | 0 215 591 | 3/1987 |
| EP | 3 299 579 | 3/2018 |
| FR | 2 746 891 | 10/1997 |
| GB | 2 099 049 | 12/1982 |
| GB | 2492883 | 1/2013 |
| JP | 2005-337386 | 12/2005 |
| WO | WO 02/16732 | 2/2002 |
| WO | WO 03/102357 | 12/2003 |
| WO | WO 2005/018865 | 3/2005 |

* cited by examiner

SEALING HOLLOW STRUCTURES

This application is a division of application Ser. No. 16/424,384 filed on May 28, 2019, which claims priority to Great Britain Application Number 1808738.7 filed on May 29, 2018.

This invention relates to sealing a hole in a wall of a hollow structure, after a fluid has flowed into or out of the structure through the hole. The invention also relates to managing the pressure and/or composition of the fluid and providing for the fluid to flow into or out of the structure before the hole is sealed.

The invention arises specifically from the problem of lowering the pressure of gas in the annulus of a pipe-in-pipe (PP) structure and then efficiently sealing the annulus to maintain that reduced pressure.

PiP structures are often used as subsea pipelines in the subsea oil and gas industry. Such pipelines may, for example, be used as lie-backs' to transport crude oil and/or natural gas from a subsea wellhead across the seabed on the way to the surface. Typically, in offshore locations, the oil and/or gas then flows up a riser from the seabed to the surface to undergo treatment and temporary storage at a surface installation. However, it is also possible for treatment and temporary storage to take place on the seabed.

Oil and gas are present in subterranean formations at elevated temperature and pressure, which may be increased by the injection of fluids such as steam. On production of the oil or gas, the produced fluid emerges from the wellhead and enters a subsea pipeline in a multi-phase state.

During subsequent transportation along the pipeline, the temperature and pressure of the produced fluid have to be kept high enough to ensure a sufficient flow rate across the seabed and up the riser. Thus, various measures are taken to ensure that the internal temperature of the pipeline remains high despite thermal exchange with the surrounding seawater, which is invariably much colder.

Low temperature increases the viscosity of the produced fluid and promotes precipitation of solid-phase materials, namely waxes and asphaltenes in crude oil and hydrates in natural gas. Such solid-phase materials tend to deposit on the inner wall of the pipeline and may eventually cause plugs, which will interrupt production. Aside from the high cost of lost production, plugs are difficult and expensive to remove and can even sever the pipeline.

In addition, an oil or gas field must occasionally be shut down for maintenance. When production restarts, temperature within the pipeline must be increased quickly so that no plugs will form.

The challenges of thermal management incase as subsea pipelines become longer. In this respect, there is a trend toward longer tie-backs as oil and gas reserves are being exploited in increasingly challenging locations.

Designers of subsea pipelines have adopted both passive and active approaches to thermal management, either individually or in combination.

In passive thermal management systems, the pipeline is thermally insulated to retain heat in fluids carried by the pipeline. Conversely, active thermal management systems add heat to the pipeline. For example, heat may be added by thermal exchange with hot fluids flowing along or around the pipeline. In an alternative approach, heat may be added by electrical heating systems.

A PiP structure is an example of passive thermal management, comprising a fluid-carrying inner pipe positioned concentrically within an outer pipe. The inner and outer pipes are spaced from each other to define an insulating annulus between them. Typically, insulating material is disposed in the annulus; it is also possible to draw down a partial vacuum in the annulus or to inject an insulating gas to reduce transmission of heat through the annulus. FR 2746891 describes a typical PiP structure with a layer of microporous insulating material and a partial vacuum in the annulus.

PiP structures provide high-performance thermal insulation. Their double-walled construction also enhances mechanical strength and leak protection.

As a common example of active thermal management, a trace heating system typically employs resistive electrical wires running along, and in thermal contact with, the outer surface of a steel pipeline. Heat produced by passing an electric current along the wires is conducted through the pipe wall to the production fluid flowing within. An example of an electrically trace-heated flowline is disclosed in WO 02/16732.

Electrically trace-heated PiP, or ETHP, employs a combination of passive and active thermal management measures to manage the temperature of production fluids particularly effectively. GB 2492883 and WO 2014/029644 disclose typical electrically trace-heated PiP flowline sections.

One way of manufacturing a PiP structure involves the use of a dedicated drawdown port through a wall of the outer pipe or in a bulkhead, with an isolation valve, as described in WO 03/102357. An advantage of this arrangement is the ability to modify pressure in the annulus during the life of the pipeline. A drawback is an increased risk of leakage.

In another approach, a permanent plug can be fitted into a drawdown port in a wall of the outer pipe. In this method, a chamber is installed around the pipe in fluid communication with the annulus through the port. Air is then pumped out of the chamber.

When a sufficient level of vacuum has been reached in the chamber and hence in the annulus, a frusto-conical plug is force-fitted, like a bung, into the hole of the port inside the chamber. After the chamber is removed rom the pipe, the plug is welded around its periphery to the outer pipe wall surrounding the hole to secure the plug in the hole and to assure sealing.

It is time-consuming to force-fit the plug, to vent and remove the chamber, to set up welding apparatus and then to weld the plug. Time may be at a premium because drawdown operations may otherwise impact the critical path during pipeline fabrication.

There is also a risk that an incorrectly-fitted plug will allow air to leak into the annulus after the chamber is removed but before the plug can be welded to ensure an effective seal. In that event, vacuum within the annulus may have to be corrected.

Against this background, the invention provides a method of sealing a hole in a wall of a hollow structure. The method comprises: providing a sealed chamber that is external to the structure and that is in fluid communication with an internal space of the structure via the hole; causing fluid to flow through the hole into or out of the chamber to adjust the pressure and/or composition of fluid in the internal space; and friction-welding a spinning plug into the hole, the plug being inserted into the hole from within the chamber.

The method of the invention is apt to be performed on a structure in the form of a pipe. In that case, the plug may be advanced into the hole along a spin axis that is substantially aligned with a central longitudinal axis of the pipe. The pipe may, for example, be an outer pipe of a pipe-in-pipe structure, the internal space then being an annulus between the outer pipe and an inner pipe.

By virtue of the invention, the pressure and/or composition of the fluid in the internal space and in the chamber may be maintained while friction-welding the plug into the hole.

After friction-welding the plug into the hole, the chamber may be removed from the structure. Then, a part of the plug that protrudes from the structure may also be removed.

The chamber may contain a welding machine that is arranged to spin the plug. Alternatively, a sealed auxiliary volume may be added to the chamber, the auxiliary volume containing a welding machine that is arranged to spin the plug. In that letter case, a sealed partition between the chamber and the auxiliary volume may be opened to form a sealed enclosure that comprises the chamber and the auxiliary volume in fluid communication with each other. The plug may then be advanced from the auxiliary volume, past the open partition and through the chamber for insertion into the hole.

The chamber and the auxiliary volume may be removed together or separately from the structure after welding the plug into the hole.

The chamber is suitably defined by an external fitting that is sealed to the structure surrounding the hole. The fitting may be strapped to the structure, in which case tension may be applied to one or more straps to pull the fitting against the structure.

The plug may be friction-welded into the hole when the pressure and/or composition of fluid in the internal space reaches a predetermined threshold.

The inventive concept also finds expression in apparatus for sealing a hole in a structure. The apparatus of the invention comprises: a fitting defining a chamber, the fitting having an opening that communicates with the chamber; an attachment system for removably attaching the fitting to the structure with the opening facing the structure; a control system arranged to control the pressure and/or composition of fluid in the chamber; and a friction plug welding machine, which machine is arranged to advance a plug from the chamber and through the opening to seal the hole in the structure. The opening is suitably surrounded by a seal.

The welding machine may be disposed within the chamber or within a housing that is attachable to the fitting to define an auxiliary volume in fluid communication with the chamber. In the latter case, the welding machine may be movable or extendable relative to the housing between a retracted position within the housing and a deployed position extended from the housing and into the chamber. A partition may be movable to seal the chamber from the auxiliary volume.

For use on a pipe, the fitting is preferably shaped to define at least one saddle formation on an end of the fitting containing the opening. The attachment system may comprise one or more tensionable straps.

In summary, the invention involves the use of the Friction Taper Plug Welding process (FTPW), otherwise known as friction plug welding, to seal an access hole in the wall thickness of a pipe.

The invention satisfies two of the main requirements of the FTPW process, namely to maintain good alignment between the plug and the hole during welding and to handle the torque and other loads that are inherent in the welding process. This involves the use of a clamping system for transferring loads between the welding machine and the pipe.

More specifically, the invention proposes the use of a sealing fitting or clamp that defines a chamber. The clamp fitting has a sealing joint that conforms to the outer surface of the pipe, thus making the chamber gas-tight when fitted to the pipe. A hole or opening communicates with the chamber to serve as a gas inlet or outlet. The clamp fitting can thereby be used to draw down pressure in the annulus and/or to inject gas into the annulus.

When the drawdown or injection operation is complete, the hole can be closed and the clamp fitting will then maintain a differential in gas pressure and/or composition between the annulus and the ambient surroundings.

A welding machine can then be mounted onto the clamp fitting to perform an FTPW operation. The welding machine is contained in a housing that cooperates with the sealed chamber of the clamp fitting to form an extended enclosure that maintains gas-tightness and hence retains a required level of vacuum or elevated pressure.

The clamp fitting may be equipped with a valve that serves as a shutter or gate allowing a plug carried by a welding machine to be advanced into the chamber. The clamp fitting may therefore be independent from the welding machine, enabling the clamp fitting to be used with standard off-the-shelf welding tools.

Once the welding machine is fitted to the clamp fitting, the valve can be opened. This balances pressure between the annulus, the clamp fitting and the housing around the welding machine. An FTPW operation can then be performed to seal the pipe annulus. At the end of the welding operation, the sealing clamp and welding machine can be removed from the pipe together or independently.

Embodiments of the invention implement a method to seal, permanently, a port used for lowering pressure in or for injecting gas into an annulus of a pipe-in-pipe structure, the method comprising: providing a chamber comprising a friction taper plug welding tool around the port; lowering pressure in or injecting gas into the chamber and into the annulus through the port; when the pressure reaches a predetermined threshold, performing friction taper plug welding on the port; and removing the chamber.

The port suitably extends through a wall of the pipe. At least an outer pipe of the pipe-in-pipe structure may be a steel pipe. The chamber is conveniently saddled and sealed around the pipe.

The friction taper plug welding tool can be operated between a retracted configuration and an active configuration in contact with the pipe. The plug is suitably welded when the pressure is below a threshold, such as 100 mbar absolute pressure.

For example, the tool may be in the retracted configuration while pressure is lowered inside the annulus and may be extended to the active configuration after a sufficiently low threshold pressure has been reached When it is in the retracted configuration, the friction taper plug welding tool may be separated from the internal space of the chamber by a valve, such as a gate valve.

Embodiments of the invention also provide a machine to seal, permanently, a port used for lowering pressure or injecting gas in the annulus of a pipe-in-pipe structure. The machine comprises: a chamber arranged to saddle the pipe around the port; an inlet for pumping gas from the chamber or injecting gas into the chamber; and a friction taper plug welding tool that can be moved between a retracted configuration in which gas can circulate between the port, the chamber and the inlet, and an active position in which the tool isolates the port from the inlet and friction welds the plug in the port.

The chamber of the machine may also comprise a valve such as a gate valve so that the chamber can be isolated from the welding tool when the tool is in the retracted configuration. An advantage of this isolation valve is to allow a standard friction taper plug welding tool to be used without designing specific sealing arrangements between the tool and the walls of the chamber.

Figure 2:
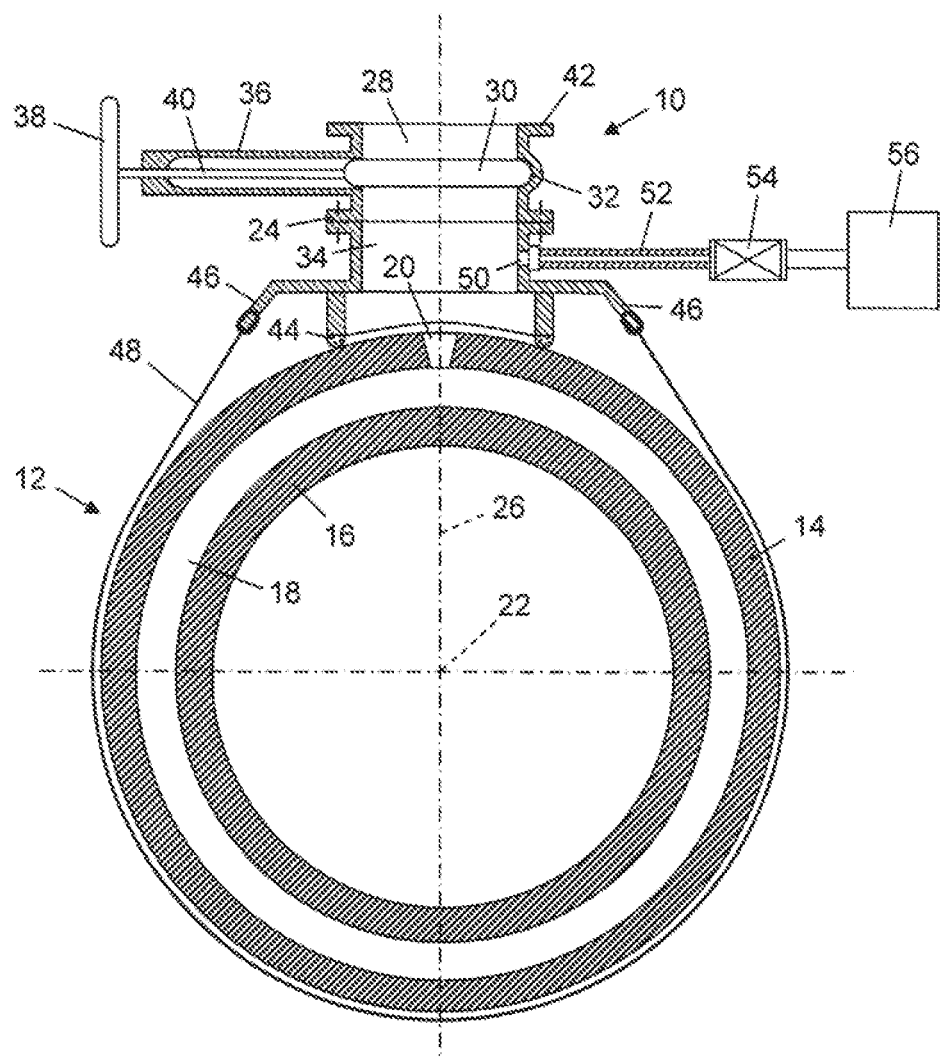
Figure 3:
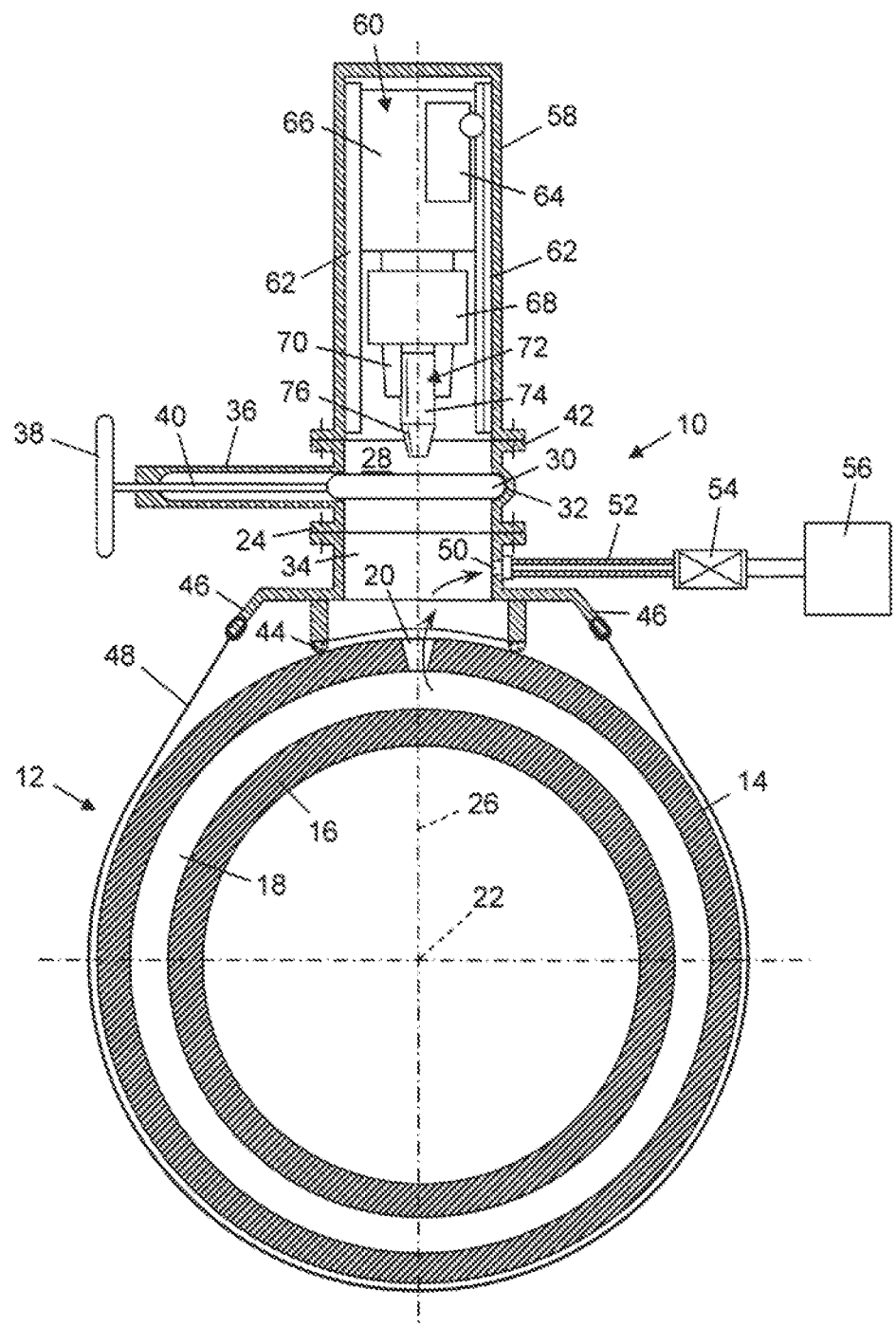
Figure 4:
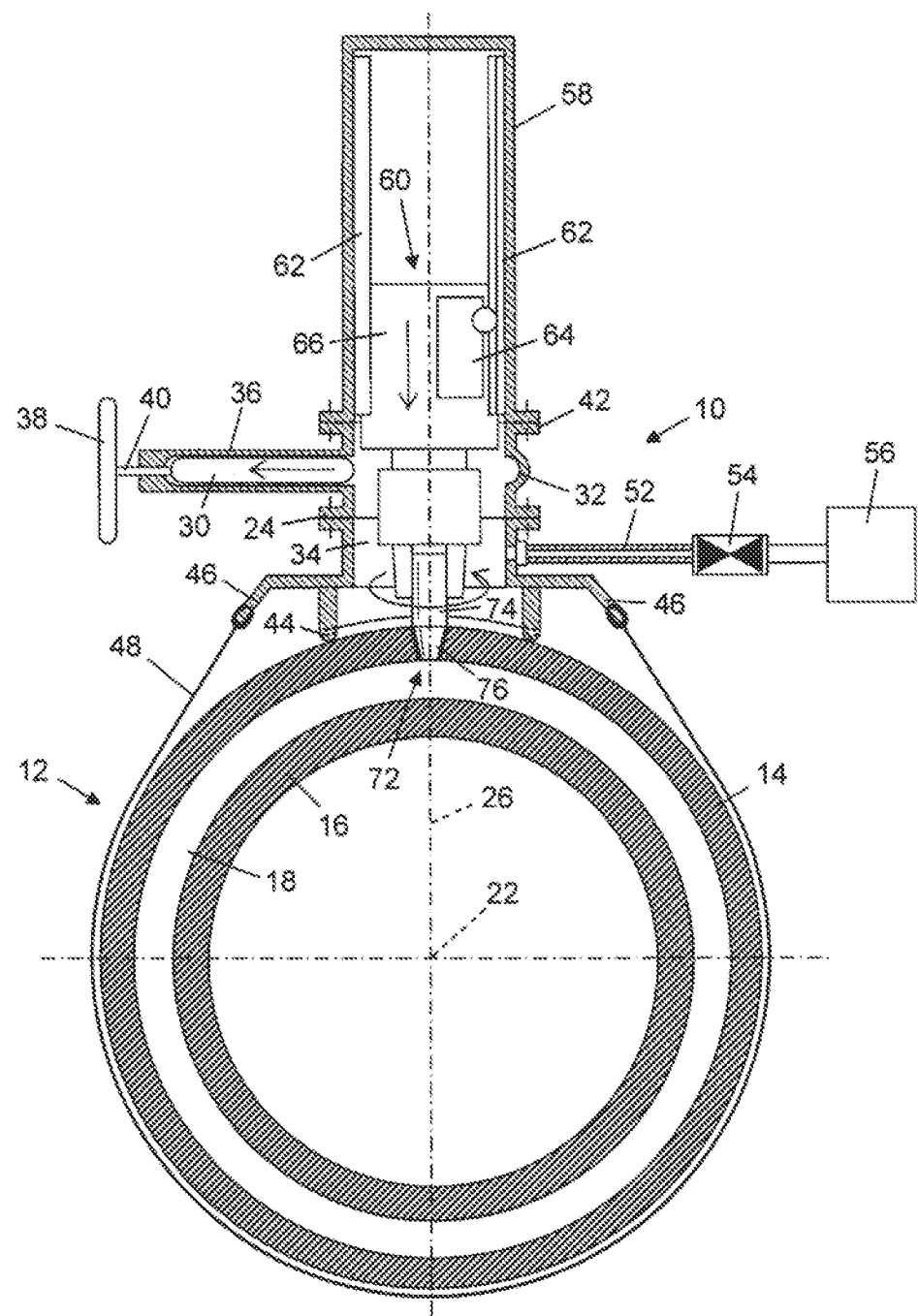
Figure 5:
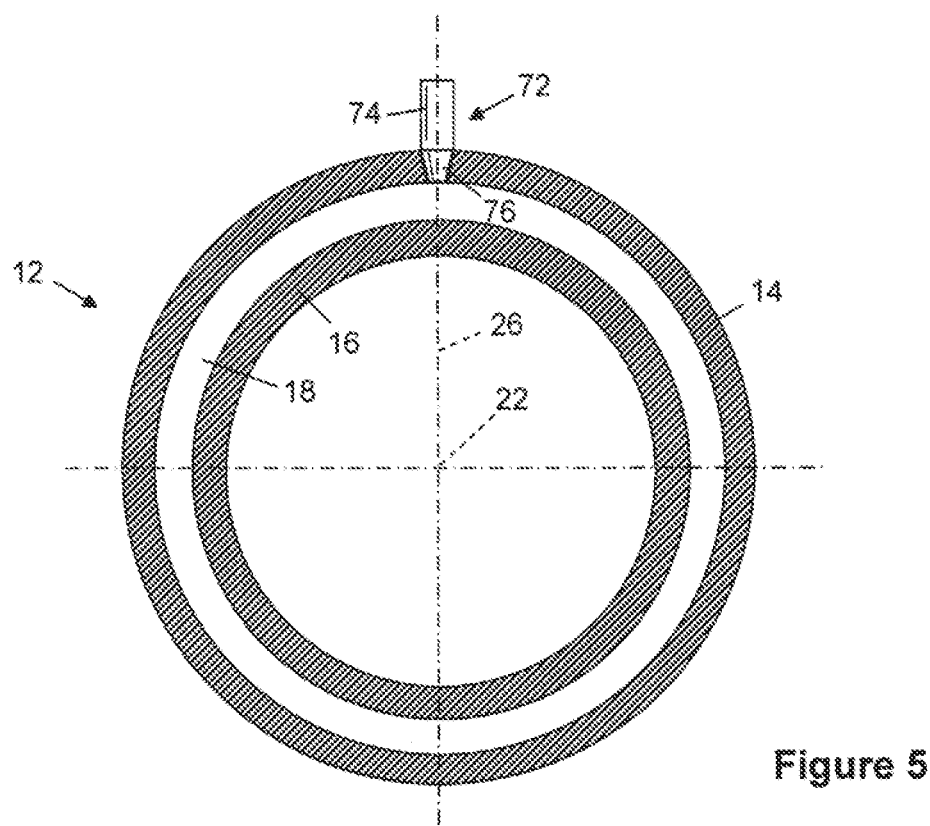
Figure 6:
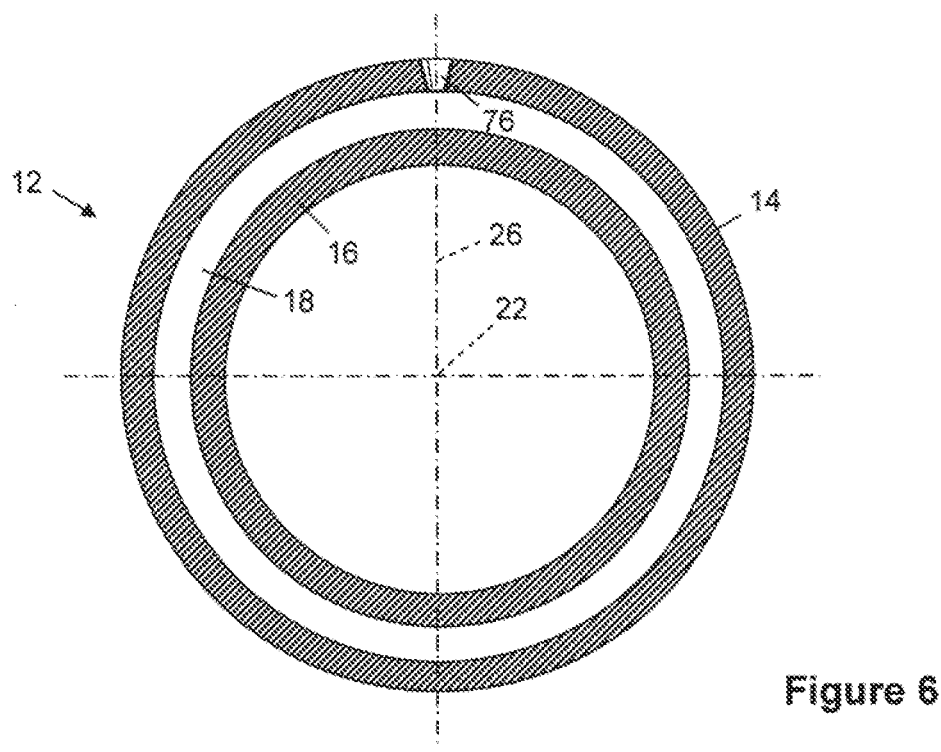

In order that the invention may be more readily understood, reference will now be made, by way of example, to the accompanying drawings in which:

FIG. 1 is an exploded cross-sectional view of a clamp fitting in accordance with the invention, aligned with a port that penetrates the outer pipe of a length of PiP pipe;

FIG. 2 corresponds to FIG. 1 but shows the fitting mounted on the pipe to surround the port in the outer pipe, and connected to a source of vacuum or gas;

FIG. 3 corresponds to FIG. 2 but shows a housing attached to the fitting, that housing containing a welding tool;

FIG. 4 corresponds to FIG. 3 but shows the welding tool advanced from the housing and through the fitting to weld a plug into the port;

FIG. 5 shows the fitting, housing and welding tool removed from the pipe to leave the welded plug protruding from the pipe; and FIG. 6 shows the protruding part of the plug cut away and ground down flush with the outer pipe.

FIGS. 1 to 4 of the drawings show a clamp fitting 10 of the invention that is arranged to be mounted onto a pipe 12 like a saddle.

The pipe 12 is of PiP configuration and so comprises an outer pipe 14 that is concentric with and spaced from an inner pipe 16. The outer and inner pipes 14, 16 are commonly both of steel, although the inner pipe 16 could instead be of a composite material. A thermally-insulating annulus 18 is defined in the space between the outer and inner pipes 14, 16.

As is conventional, the thermal insulation provided by the annulus 18 may be improved by altering the pressure and/or composition of the atmosphere in the annulus 18. For example, thermal management may involve evacuating air from the annulus 18 to draw down a partial vacuum in the annulus 18. Alternatively, thermal management may involve introducing other gases into the annulus 18 that reduce heat transmission, such as xenon or other rare or noble gases. Such gases may be at ambient pressure or below or above ambient pressure.

To modify the atmosphere in the annulus 18 in these ways, the outer pipe 14 is penetrated by a drawdown hole or port 20 that communicates with the annulus 18. This allows air or other gases to be drawn from or pumped into the annulus 18 as appropriate. In accordance with the invention, the port 20 tapers so as to narrow in a radially-inward direction toward the central axis 22 of the pipe 12.

In this example, the port 20 is aligned with the central axis 22 of the pipe 12. Such alignment between the port 20 and the central axis 22 is preferred but is not essential.

The clamp fitting 10 comprises a tubular body 24 that surrounds a longitudinal axis 26. The longitudinal axis 26 is shown here intersecting the central axis 22 of the pipe 12 and in radial alignment with the port 20 in the outer pipe 14.

The hollow interior of the body 24 opens to opposite ends to define a lumen 28 that extends longitudinally through the body 24. Those opposed ends of the body 24 are identified in the following description as outer and inner ends, expressed in a radial direction along the longitudinal axis 26 with respect to the central axis 22 of the pipe 12. The lumen 28 defines openings in the outer and inner ends of the body 24.

In this example, the fitting 10 is capable of serving as an isolation valve. Thus, the lumen 28 of the body 24 can be closed by a partition 30 that is disposed between the outer and inner ends. The partition 30 is movable transversely across the longitudinal axis 26 between an extended, closed position shown in FIGS. 1 to 3 and a retracted, open position shown in FIG. 4. In the closed position, the partition 30 is sealed gas-tightly to the body 24 and thereby serves as a gate valve element.

When in the closed position, the partition 30 seats into and seals against a complementary groove 32 in the body 24. A chamber 34 is thereby defined within the body 24 on the radially inner side of the partition 30. When the flitting 10 has been sealed to the pipe 12 and the partition 30 is closed as shown in FIGS. 2 and 3, the chamber 34 is a gas-tight space that communicates with the annulus 18 of the pipe 12 through the port 20 in the outer pipe 14.

When in the open position, the partition 30 is accommodated by a hollow lateral extension 36 of the body 24. The interior of the extension 36 communicates with the lumen 28 of the body 24 but is otherwise isolated from the exterior of the body 24.

Movement of the partition 30 between the closed and open positions is driven by a drive mechanism 38 that may be operable manually or by a motor. The drive mechanism 38 may, for example, comprise a screw 40 that acts between the partition and the body 24.

The outer end of the body 24 is surrounded by a mounting flange 42. Conversely, the inner end of the body 24 is shaped as a rigid skirt that extends toward the pipe 12 and surrounds the lumen 28 of the body 24. The skirt supports a continuous, resiliently-flexible gasket 44 in a saddle formation with concave cylindrical edge curvature to complement the outer radius of the pipe 12.

The gasket 44 is shaped to surround the port 20 in the outer pipe 14 and to seal against the outer surface of the outer pipe 14 when the fitting 10 is pressed radially inwards against the pipe 12. For this purpose, the body 24 of the fitting 10 has attachment formations 46 that support respective ends of a chain, band or strap 48 that embraces the pipe 12. In this example, the attachment formations 46 extend from the body 24 substantially tangentially with respect to the outer diameter of the pipe 12. The strap 48 is tensioned to pull the fitting 10 toward the pipe 12 and hence to compress the gasket 44 gas-tightly against the pipe 12 as shown in FIGS. 2, 3 and 4.

A side wall of the body 24 on a radially inner side of the partition 30 is penetrated by an opening 50 to which a pipe or hose 52 can be coupled to communicate with the chamber 34, as shown in FIGS. 2, 3 and 4.

At its other end, the hose 52 communicates via a valve 54 with an atmosphere control system 56 for determining the pressure and/or composition of the atmosphere in the annulus 18. As is conventional, the valve 54 is shown as white when open and as black when closed.

The system 58 may, for example, comprise a pump that is arranged to draw air from the chamber 34 and hence, via the port 20, from the annulus 18 to draw down a partial vacuum in the annulus 18. The system 56 may also, or alternatively, comprise a source of a thermally-insulating gas such as xenon that is pumped into the chamber 34 and hence, via the port 20, into the annulus 18 to replace air in the annulus 18.

The hose 52 may be coupled to the opening 50 to connect the system 56 to the fitting either before or after the fitting 10 has been attached to the pipe 12 as shown in FIG. 2.

Turning now to FIG. 3, this shows a removable housing 58 attached to the fitting 10. The housing 58 defines an auxiliary volume that contains a friction taper plug welding tool 60.

The housing 58 has an open inner end that is attached to the mounting flange 42 at the outer end of the body 24 of the fitting 10, such that the lumen 28 of the body 24 extends into the housing 58. The housing 58 thereby closes the open outer end of the body 24 while cooperating with the body 24 to define a continuous sealed enclosure that comprises the lumen 28 of the body 24 and the interior of the housing 58.

The housing 58 is preferably attached to the fitting 10 after the fitting 10 has been attached to the pipe 12. In principle, however, the housing 58 could be attached to the fitting 10 before the fitting 10 is attached to the pipe 12, so that the housing 58 and the fitting 10 may be attached to the pipe 12 together. Similarly, the housing 58 and the fitting 10 may also be removed from the pipe 12 together or the housing 58 may be removed from the fitting 10 before the fitting 10 is removed from the pipe 12.

The welding tool 60 is mounted to move relative to the housing 58 in directions parallel to the longitudinal axis 26. In this example, the welding tool 60 is mounted on rails 62 within the housing 58.

A drive system 64 is operable move the welding tool 60 longitudinally within the housing 58. The drive system 64 may, for example, comprise a stepper motor that drives a pinion along a rack extending along at least one of the rails 62.

The welding tool 60 comprises a motor 66 that is operable to turn a chuck 68 about the longitudinal axis 26 as shown in FIG. 4. The chuck 68 has jaws 70 that can be moved laterally to clamp a mandrel or welding plug 72 that is centred on the longitudinal axis 26.

The plug 72 comprises a cylindrical body 74 and a tapered head 76. The taper angle of the head 76 substantially matches the taper angle of the port 20 in the outer pipe 14. The length of the head 76 substantially matches the thickness of the outer pipe 14. The diameter of the body 74, and hence of the widest part of the head 76, substantially matches the maximum width of the port 20 at the outer surface of the outer pipe 14.

FIG. 3 shows the partition 30 in the closed position and the welding tool 60 retracted within the housing 58 to the extent that the head 76 of the plug 72 is on the radially outer side of the partition 30. Conversely, FIG. 4 shows the partition 30 now retracted into the open position. This allows the plug 72 to advance to the radially inner side of the partition 30 when the drive system 64 moves the welding tool 60 relative to the housing 58 in a radially inward direction.

The atmosphere control system 56 may be activated before or after the partition 30 has been retracted. With the valve 54 in the hose 52 kept open, the system 56 draws air out of the chamber 34 and/or pumps a replacement gas into the chamber 34. This controls the pressure and/or composition of the atmosphere in the chamber 34 and hence in the annulus 18 that communicates with the chamber 34 through the port 20 in the outer pipe 14.

FIG. 3 shows the atmosphere control system 56 activated before the partition 30 has been retracted, and drawing air from the chamber 34 and hence from the annulus 18 that communicates with the chamber 34 through the port 20. It would also be possible to activate the atmosphere control system 56 before the housing 58 is attached to the fitting 10, when the partition 30 is in the closed position to enclose and seal the chamber 34 as in FIG. 2.

When the atmosphere in the annulus 18 is at the appropriate pressure and/or composition, the valve 54 in the hose 52 is closed as shown in FIG. 4. Next, the port must be closed to seal the annulus 18 and hence to trap the atmosphere in the annulus 18 with the desired pressure and/or composition. For this purpose, the partition is retracted into the open position to allow the drive system 62 to deploy the welding tool 60 from the housing 58 and into the chamber 34.

The welding tool 60 is advanced from the housing 58 and into the chamber 34 to the extent that the head 78 of the plug 72 enters the port 20 in the outer pipe 14. As the welding tool 60 is advanced in this way, the motor 64 turns the chuck 66 of the welding tool 60. This spins the plug 72 about the longitudinal axis 26 around which the port 20 is also centred.

When the tapered head 76 of the spinning plug 72 encounters the similarly-tapered stationary wall that surrounds the complementary port 20, friction generates heat that quickly melts the interface between the head 76 and the surrounding outer pipe 14. The motor 64 is then stopped so that the now stationary plug 72 and the outer pipe 14 fuse together. As the molten interface cools, the port 20 is thereby sealed by virtue of a strong and continuous weld between the head 78 of the plug 72 and the outer pipe 14.

After venting the chamber 34 to equalise pressure in the chamber 34 with the ambient air pressure, the fitting 10, housing 58 and welding tool 60 may be removed from the pipe 12. This leaves the body 74 of the welded plug 72 protruding from the outer pipe as shown in FIG. 5. Finally the body 74 of the plug 72 is cut away and ground down flush with the outer pipe 14 as shown in FIG. 6, leaving the head 76 of the plug 72 welded in the port 20.

Many variations are possible within the inventive concept. For example, the inner pipe 16 could be lined with a polymer lining or other corrosion-resistant lining or coating. The outer pipe 14 could be coated with a protective or thermally-insulating coating of, for example, polypropylene. The annulus 18 could contain heating elements and/or insulating material. However, all such optional additions have been omitted from the drawings for clarity.

The atmosphere control system 58 that determines the pressure and/or composition of the atmosphere in the annulus 18 could be configured to supply a gas into the chamber 34 whose composition supports the welding operation.

The gasket 44 could be supplemented by a rigid locating structure that is shaped to match the curvature of or otherwise to engage the outer surface of the pipe 12 when the gasket 44 has been compressed by tightening the strap 48.

In principle, it would be possible for the housing 58 to be integrated with the fitting 10 so that the housing 58 and the welding tool 60 form part of the fitting 10 and are attached to and removed from the pipe 12 as a single unit. In that case, the partition 30 could be omitted.

Whilst the invention has been illustrated in the context of a pipe-in-pipe system, the invention could be used in other contexts. In particular, the invention could be used in other applications to seal a hole that is provided in a wall of a hollow structure for ingress or egress of fluid into or from a space within the structure, while managing the pressure or composition of the fluid and providing for the fluid to flow into or out of that space before the hole is sealed. In a broad sense, the fluid needs not be a gas but could be another fluid such as a liquid, a gel or a particulate mass.

The invention claimed is:

1. A method of sealing a hole in a wall of a hollow structure, the method comprising:
   providing a sealed chamber that is external to the structure and that is in fluid communication with an internal space of the structure via the hole;
   adding a housing defining a sealed auxiliary volume to the chamber, the auxiliary volume containing a welding machine that is arranged to spin a plug;
   opening a sealed partition between the chamber and the auxiliary volume to form a sealed enclosure that comprises the chamber and the auxiliary volume in fluid communication with each other;
   causing fluid to flow through the hole into or out of the sealed enclosure to adjust the pressure and/or composition of fluid in the internal space; and
   friction welding a spinning plug into the hole, the plug being inserted into the hole from within the sealed enclosure.

2. The method of claim 1, performed on a structure in the form of a pipe.

3. The method of claim 2, comprising advancing the plug into the hole along a spin axis that is substantially aligned with a central longitudinal axis of the pipe.

4. The method of claim 2, wherein the pipe is an outer pipe of a pipe in pipe structure and the internal space is an annulus between the outer pipe and an inner pipe.

5. The method of claim 1, comprising maintaining the pressure and/or composition of the fluid in the internal space and in the chamber while friction welding the plug into the hole.

6. The method of claim 1, further comprising removing the chamber from the structure and then removing a part of the plug that protrudes from the structure.

7. The method of claim 1, wherein the chamber contains a welding machine that is arranged to spin the plug.

8. The method of claim 1, comprising advancing the plug from the auxiliary volume, past the open partition and through the chamber for insertion into the hole.

9. The method of claim 1, comprising removing the chamber and the auxiliary volume together from the structure after welding the plug into the hole.

10. The method of claim 1, wherein the chamber is defined by an external fitting that is sealed to the structure surrounding the hole.

11. The method of claim 10, comprising strapping the fitting to the structure and applying tension to pull the fitting against the structure.

12. The method of claim 1, comprising friction welding the plug into the hole when the pressure and/or composition of fluid in the internal space reaches a predetermined threshold.

* * * * *